United States Patent Office 3,506,395
Patented Apr. 14, 1970

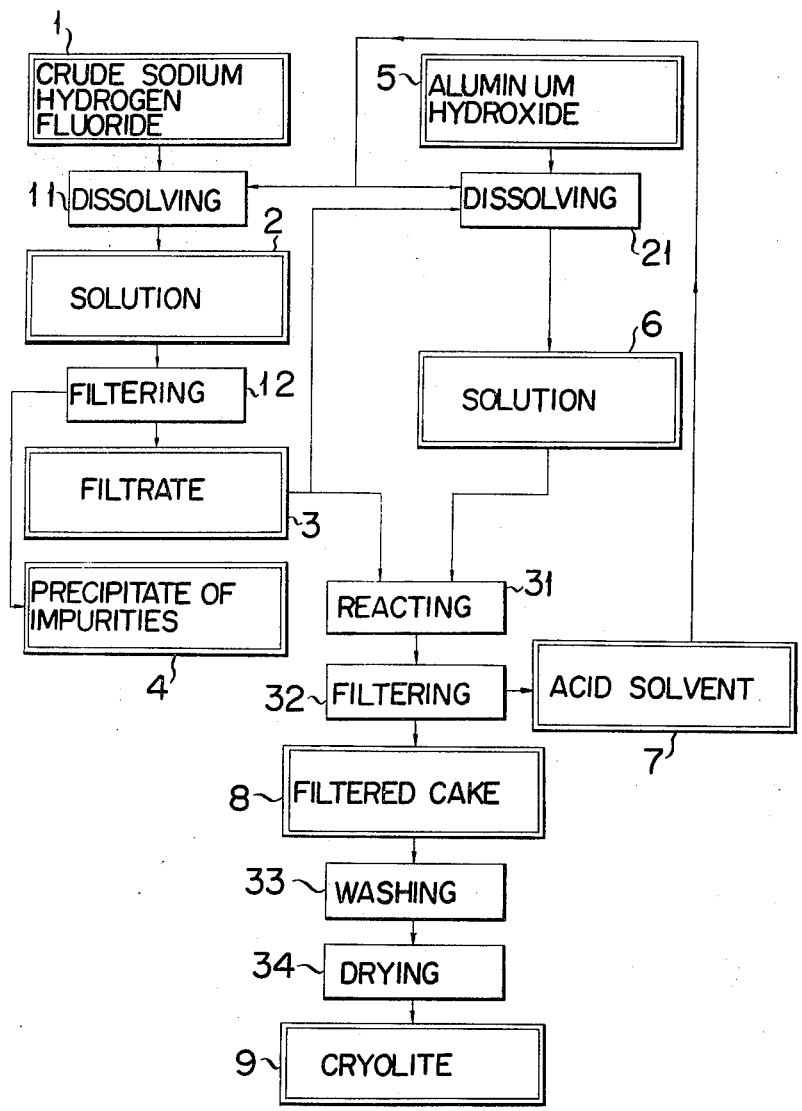

3,506,395
PROCESS OF PREPARING HIGH QUALITY ARTIFICIAL CRYOLITE
Taro Yamaguchi and Hirokazu Satoh, Tokyo, Japan, assignors to Onoda Cement Co., Ltd., Yamaguchi, Japan, a corporation of Japan
Filed Jan. 3, 1968, Ser. No. 695,423
Int. Cl. C01f 7/54; C01b 9/08; C01d 3/02
U.S. Cl. 23—88
9 Claims

ABSTRACT OF THE DISCLOSURE

A process of preparing artificial cryolite which comprises dissolving crude sodium bifluoride in a part of diluted mineral acid to separate the precipitated impurities contained in the raw material, dissolving aluminum hydroxide of gibbsite type consisting of coarse crystals, e.g., Bayer process material, in another part of diluted mineral acid, mixing the two solutions to react sodium bifluoride with aluminum hydroxide to precipitate synthesized cryolite in accordance with the reaction, and separating out the precipitate from the acidic mother liquor to be washed and dried. It is preferable to re-use the mother liquor as a circulating solvent for the two raw materials respectively.

BACKGROUND OF THE INVENTION

This invention relates to a process of preparing artificial cryolite, and more particularly to a process of preparing from raw crude sodium bifluoride artificial cryolite of high quality adapted mainly for use as a flux in electrolytic reduction of aluminum metal.

Cryolite indispensable as a flux for raw aluminum oxide to the reduction of aluminum metal is supplied in large quantities by the artificial process as well as from the natural source. In the case of artificial production, it is required that the content of silicon as an impurity of the cryolite is under 0.1% as $SiO_2$.

A usual method of manufacturing artificial cryolite $Na_3AlF_6$ consists of dissolving aluminum hydroxide in hydrofluoric acid to form an aqueous solution of aluminum fluoride, and reacting sodium hydroxide with the fluoride. Other known manufacturing processes use sodium fluoride $NaF$ or fluoboric acid $HBF_4$ as a source of fluorine, and many forms of aluminum salt or sodium aluminate as a source of aluminum. However, sodium bifluoride $NaHF_2$ has never been used as a raw material for preparing artificial cryolite because of its very low solubility in water and its inferior purity.

The crude sodium bifluoride can be easily prepared by half-neutralising the hydrogen fluoride recovered from a waste gas by water washing in the phosphoric acid industry, fused or calcined phosphate fertiliser industry, aluminum reduction industry, fluorine handling industry or else, like the following reaction 1.

$$2HF + NaOH = NaHF_2\downarrow + H_2O \qquad (1)$$

The yield of precipitate of sodium hydrogenfluoride is very good because of its low solubility in water, but it contains simultaneously the precipitate of impurities such as sodium silicofluoride and calcium fluoride.

It was conceived by the present inventors that it should be possible to manufacture pure cryolite, according to the simple reaction shown by the following chemical Formula 1, if there were discovered any suitable solvent which could dissolve $NaHF_2$ and $Al(OH)_3$ respectively, but not the impurities contained in the crude sodium bifluoride and the produced cryolite respectively.

$$3NaHM_2 + Al(OH)_3 = Na_3AlF_6 + 3H_2O \qquad (2)$$

An object of the present invention is to prepare pure artificial cryolite by using crude sodium bifluoride as a raw material.

A further object of the present invention is to discover a suitable solvent for the raw materials to perform the chemical reaction according to the Equation 2.

SUMMARY OF THE INVENTION

The above objects may be attained in accordance with the present invention by the process which comprises dissolving crude sodium bifluoride in a part of diluted mineral acid, which is selected from a group consisting of hydrochloric acid, sulfuric acid, nitric acid and any mixed acid thereof and has a concentration of from 5 to 25%, in the almost saturated state to precipitate and separate the impurities contained in the raw material, dissolving the aluminum hydroxide obtained from bauxite by the Bayer process in another part of the above-mentioned mineral acid, mixing the two solutions to react sodium bifluoride with aluminum hydroxide to precipitate synthesised cryolite in accordance with the reaction, and separating out the precipitate from the acidic mother liquor to be washed and dried. It is preferable to re-use the mother liquor as a circulating solvent for the two raw materials respectively.

The features of the invention which are believed to be novel are set forth particularly in the appended claims. The invention itself, however, as to its organisation together with further objects and advantages thereof, may best be understood by reference to the following description taken in connection with the accompanying drawing.

BRIEF DESCRIPTION OF THE DRAWING

The drawing shows a flow diagram of the circulating process of the present invention.

DETAILED DESCRIPTION OF THE INVENTION

The process of the present invention will be described in three stages as follows:

Stage I.—Dissolution of crude sodium bifluoride

The sodium bifluoride recovered by half-neutralisation from a waste gas from related industries bearing hydrogen fluoride gas always contains some percent sodium silicofluoride $Na_2SiF_6$ as an impurity. For instance, the sodium bifluoride recovered from the waste gas released in the manufacture of calcined phosphate fertiliser contains from 2 to 5 percent sodium silicofluoride. Unless the silicon compound is removed from the crude sodium bifluoride first of all, most of it will be carried into the subsequently produced cryolite, making it useless as a flux in aluminum reduction.

It has been found by the present inventors that sodium bifluoride has low solubility in water, whereas it has high-solubility in hydrochloric acid, sulfuric acid, nitric acid or any mixture thereof—these acids will be called collectively mineral acid hereafter, and carbonic acid or phosphoric acid is not contained in the mineral acid because of weak acidity as to the former and abomination in the aluminum industry as to the latter—and that its solubility rises with the increasing concentration of the acid. The solubilities of sodium bifluoride which was obtained experimentally by the present inventors in various concentrations of hydrochloric acid, sulfuric acid and nitric acid at a temperature of 25° C. as presented in Table 1.

TABLE 1.—SOLUBILITIES OF $NaHF_2$ IN VARIOUS CONCENTRATIONS OF MINERAL ACID
[g./100 ml. of solution]

| Conc. of HCl (percent) | 0 | 5 | 10 | 15 | 20 | 25 | |
|---|---|---|---|---|---|---|---|
| Solubility of $NaHF_2$ | 4.2 | 9.3 | 14.5 | 18.5 | 21.9 | 23.7 | |
| Conc. of $H_2SO_4$ (percent) | 0 | 5 | 10 | 15 | 20 | 25 | 30 | 35 |
| Solubility of $NaHF_2$ | 4.2 | 7.3 | 10.2 | 13.2 | 15.4 | 17.9 | 20.1 | 22.0 |
| Conc. of $HNO_3$ (percent) | 0 | 5 | 10 | 15 | 20 | 25 | |
| Solubility of $NaHF_2$ | 4.2 | 7.8 | 12.3 | 14.5 | 17.8 | 20.0 | |

When hydrofluoric acid or its mixtures with hydrochloric acid, sulfuric acid or nitric acid are employed, the solubility of $NaHF_2$ in these acids will be noticeably below those in Table 1. The reason may be accounted for by the following assumption. When $NaHF_2$ is introduced into the mineral acid, the equilibrium between them shifts toward the right side due to reactions of the following Formulas 3, 4 and 5 to cause the dissolution of $NaHF_2$.

$$NaHF_2 + HCl \rightleftharpoons NaCl + 2HF \tag{3}$$

$$NaHF_2 + H_2SO_4 \rightleftharpoons NaHSO_4 + 2HF \tag{4}$$

$$NAHF_2 + HNO_3 \rightleftharpoons NaNO_3 + 2HF \tag{5}$$

However, addition of HF to each of these systems will transfer the equilibrium toward the left side to make $NaHF_2$ low soluble. Sodium bifluoride does not dissolve substantially in hydrofluoric acid solution.

When the concentration of hydrochloric acid or nitric acid exceeds 20 percent and that of sulfuric acid exceeds 25 percent respectively, the increase in the $NaHF_2$ solubility will become less noticeable. Moreover, use of highly concentrated acids will be uneconomical and present difficulties in handling. Therefore, it will be preferable to use the mineral acid as a solvent for sodium bifluoride at 5 to 25 percent concentrations. As described later, the concentrations of the acid within this range will be exactly favourable for the precipitation of impurities contained in the crude sodium bifluoride and also for the disolution of aluminum hydroxide in the mineral acid.

It has been found by the present inventors that, when crude sodium bifluoride is dissolved in the mineral acid to an extent approaching saturation, almost all sodium silicofluoride $Na_2SiF_6$, an impurity contained in the crude material, is precipitated. The solubility of $Na_2SiF_6$ in water at normal temperature is about 760 mg. per 100 ml. of the solution, and when converted to $SiO_2$, the value will be 25 mg./100 ml. It is also known that the solubility of $Na_2SiF_6$ in the mineral acid further increases over this value. On the contrary, it has been discovered by the present inventors that, in the mineral acid containing disolved sodium bifluoride, the $Na_2SiF_6$ solubility will decrease with the increasing concentrations of $NaHF_2$, and that in 5 to 25 percent mineral acid solution saturated or approximately saturated with $NaHF_2$, the $Na_2SiF_6$ solubility is extremely as low as 4 mg. per 100 ml. of the solution maximum. The $Na_2SiF_6$ solubilities in various concentrations of mineral acid obtained by the inventors' experiments are presented in Table 2.

TABLE 2.—$Na_2SiF_6$ SOLUBILITIES IN MINERAL ACID SATURATED WITH $NaHF_2$ AT NORMAL TEMPERATURE
[mg./100₂ ml.]

| Conc. of HCl saturated with $NaHF_2$ (percent) | 0 | 2 | 5 | 10 | 15 | 20 | 25 | |
|---|---|---|---|---|---|---|---|---|
| Solubility of $Na_2SiF_6$ as $SiO_2$ | 22.6 | 10.0 | 6.5 | 3.1 | 2.5 | 1.9 | 1.8 | |
| Conc. of $H_2SO_4$ saturated with $NaHF_2$ (percent) | 0 | 5 | 10 | 15 | 20 | 25 | 30 | 35 |
| Solubility of $Na_2SiF_6$ as $SiO_2$ | 22.6 | 14.3 | 12.0 | 6.8 | 3.9 | 3.5 | 3.6 | 3.4 |
| Conc. of $HNO_3$ saturated with $NaHF_2$ (percent) | 0 | 5 | 10 | 15 | 20 | 25 | |
| Solubility of $Na_2SiF_6$ as $SiO_2$ | 22.6 | 10.3 | 7.2 | 3.2 | 2.0 | 2.0 | |

Use of hydrofluoric acid does not increase the solubility of $NaHF_2$, but conversely promotes solution of $SiO_2$, so that it is not favourable to use hydrofluoric acid in this stage of the present invention.

From the above-mentioned reason it is clear that the first step of the present invention comprises dissolving the crude sodium bifluoride in the mineral acid of which concentration is from 5 to 25 percent approximately to saturation, and filtering out the resulting precipitate of impurities contained in the raw sodium bifluoride to produce a clear mineral acid solution of sodium bifluoride substantially free from silicon compound. It is the main point of this invention to obtain high purity cryolite crystals by reacting this clear solution with a mineral acid solution of the aluminum hydroxide produced by the Bayer process i.e. aluminum hydroxide of gibbsite type and consisting of coarse crystals. As will be seen from Table 2, the most preferable concentrations of each mineral acid are 5 to 20 percent for hydrochloric acid, 15 to 25 percent for sulfuric acid and 10 to 20 percent for nitric acid. For any mixed mineral acid proper concentrations may be determined by calculation from the above ranges.

During this step of dissolving crude sodium bifluoride in the mineral acid, calcium fluoride, another impurity in the crude material, is simultaneously separated from the solution into the precipitate of silicon compound almost completely.

The required amounts of the mineral acid for dissolving crude sodium bifluoride range between a sufficient amount to cause the $NaHF_2$ content to be saturated in the acid and twofold thereof.

Stage II.—Dissolution of aluminum hydroxide

On the other hand, it is preferable to use aluminum hydroxide manufactured by the Bayer process, which is the industrially cheapest, as the source of aluminum atom in the synthesised cryolite. When it is desired to obtain aluminum hydroxide solution in the mineral acid, amorphous or microcrystalline aluminum hydroxide will serve the purpose because it can be dissolved in the mineral acid with relative ease, but it is very expensive. On the contrary, the Bayer process aluminum hydroxide has a crystal structure of gibbsite type and generally consists of coarse crystals. Consequently, the dissolution of aluminum hydroxide of this type will require extremely high concentration of the acid and heat treatment of very long time, and so this would be considerably inconvenient in industrial practice.

As a result of many experiments, it has been found by the present inventors that the mineral acid, even though at a relatively as low concentration as 5 to 25 percent, is capable of dissolving the Bayer process aluminum hydroxide in a short time if it contains from 2 to 9 percent of dissolved sodium bifluoride. The experiments were carried out to compare the case wherein the Bayer process aluminum hydroxide was dissolved in a diluted solution of hydrochloric acid or sulfuric acid and the other case wherein the same aluminum hydroxide was dissolved in these acids containing sodium bifluoride. The results are presented in Tables 3 and 4. The dissolving rate of aluminum hydroxide was determined by heating the mineral acids conditioned as shown in the tables to the prescribed temperature, adding the prescribed amounts of the Bayer process aluminum hydroxide with stirring for 40 minutes and measuring the amount of residual precipitate.

TABLE 3.—DISSOLVING RATE OF Al(OH) IN HCl SOLUTION

| Composition of acid solution: | | | | | | | |
|---|---|---|---|---|---|---|---|
| HCl, g./l | 150 | 150 | 150 | 150 | 150 | 150 | 150 |
| $NaHF_2$, g./l | 0 | 0 | 0 | 30 | 30 | 80 | 100 |
| Added $Al(OH)_3$, g./l | 71.3 | 71.3 | 71.3 | 89.1 | 89.1 | 89.1 | 89.1 |
| Equivalent of HCl to $Al(OH)_3$ | 1.5 | 1.5 | 1.5 | 1.2 | 1.2 | 1.2 | 1.2 |
| Dissolving temperature, °C | 25 | 60 | 90 | 25 | 60 | 90 | 60 |
| Dissolved $Al(OH)_3$, percent | 20.9 | 31.2 | 49.4 | 65.3 | 95.6 | 100 | 96.3 |

TABLE 4.—DISSOLVING RATE OF Al(OH)₃ IN H₂SO₄ SOLUTION

| Composition of acid solution: | | | | | | | |
|---|---|---|---|---|---|---|---|
| H₂SO₄, g./l | 200 | 200 | 200 | 200 | 200 | 200 | 200 |
| NaHF₂, g./l | 0 | 0 | 0 | 20 | 50 | 80 | 100 |
| Added Al(OH)₃, g./l | 88.4 | 70.7 | 58.9 | 88.3 | 88.3 | 88.3 | 88.3 |
| Equivalent of H₂SO₄ to Al(OH)₃ | 1.2 | 1.5 | 1.8 | 1.2 | 1.2 | 1.2 | 1.2 |
| Dissolving temperature, °C | 80 | 80 | 80 | 80 | 80 | 80 | 80 |
| Dissolved Al(OH)₃, percent | 72.0 | 74.0 | 79.6 | 99.1 | 100 | 100 | 97.8 |

As will be seen from Tables 3 and 4, the dissolving rate of the Bayer process aluminum hydroxide begins to decline again at 10 percent or higher concentrations of $NaHF_2$. To practise the process of the present invention, therefore, it is advisable to limit the concentration of $NaHF_2$ in the mineral acid shown in the tables to within the range of from 2 to 9 percent.

As indicated by the reaction Formulas 3, 4 and 5, dissolution of sodium bifluoride in the mineral acid produces HF in the solution. Since this HF is considerably active, it is deemed to act catalytically so as to promote the dissolution of the Bayer process aluminum hydroxide in the mineral acid of comparatively low concentration at low temperatures. At too high concentrations of $NaHF_2$, however, it has been confirmed that there would be formed precipitates of cryolite $Na_5Al_3F_{14}$ or similar compounds, and that in such event the dissolution of the Bayer process aluminum hydroxide may be obstructed. While this fact is associated with the concentration of the mineral acid used, it is necessary for practical purpose to limit the content of $NaHF_2$ in the mineral acid, which may be also used on the dissolution of crude sodium bifluoride at concentrations of from 5 to 25 percent as mentioned before, to from 2 to 9 percent.

Where it is not considered to circulate the mineral acid solution in dissolving crude sodium bifluoride or aluminum hydroxide, hydrofluoric acid, having the concentration of from 1 to 15 percent, may also be used as a solvent of aluminum hydroxide. However, in the case of circulating use, hydrofluoric acid will harmfully effect on the dissolution of sodium bifluoride as mentioned previously.

Stage III.—Synthesis of cryolite

The last step of the present invention is concerned with the formation of cryolite. At this stage, the mineral acid solution of substantially pure sodium bifluoride prepared at the step of I and the acidic solution of aluminum hydroxide prepared at the step of II are mixed to carry out the reaction of the Formula 2, and the resulting cryolite precipitate is filtered out, water-washed and dried to obtain the final product of artificial cryolite. This reaction progresses quickly, completing within 30 minutes at normal temperature with full stirring.

Speaking of the ratio in which these acid solutions are to be mixed, the yield and the thermal stability of the product will be increased when the $NaHF_2$ content of the whole system is maintained over the theoretical quantity according to the Formula 2, for instance, 1 to 9 percent in excess.

The mother liquor of the mineral acid or hydrofluoric acid separated from the product containing some remained sodium bifluoride may be utilised in any other suitable chemical use.

The cryolite obtained by the process of the present invention is characterised in that it is inexpensive, almost completely free from impurities, particularly silicon compounds, and has excellent thermal stability. Unlike natural cryolite, the artificial cryolite heretofore manufactured was easily subject to thermal decomposition. For instance, when heated to around 800° C., the prior art artificial cryolite used to suffer a 3 to 10 percent ignition loss. As a rule, therefore, a process has been employed, after synthesis of cryolite, further to calcine it to temperatures of 400 to 600° C. to obtain a final product. However, the process of the present invention produces cryolite of stable crystal structure due to the precipitation of crystals in large amount of mineral acid, and so enables a finished product having an ignition loss of 1.5 percent maximum at 800° C. to be obtained merely by separating these crystals from the mother liquor, followed by water washing and drying at a temperature of about 110° C.

For reference, if amorphous aluminum hydroxide of the reagent grade, aluminum chloride or aluminum sulfate, all of them being very soluble in the mineral acid, is used in place of the Bayer process aluminum hydroxide, it will be possible to obtain the same results as by the process of the present invention by directly dissolving these compounds in the pure mineral acid solution of sodium bifluoride without carrying out said dissolution separately from that of crude sodium bifluoride. However, these chemical substances are manufactured from the Bayer process aluminum hydroxide and far more expensive than the raw hydroxide. Therefore, the process of the present invention including the direct use of the Bayer process aluminum hydroxide as one of the raw materials for synthesis of cryolite should be deemed most advantageous and practical from an economical point of view.

Appended stage.—Circulation of acid solvent

The excess sodium bifluoride remaining in the mother liquor separated from the precipitate of cryolite at the aforementioned stage III can be effectively utilised as a part of the raw material in the manufacture of cryolite according to the process of the present invention. That is to say, it is preferable to circulate the mother liquor for use as an acid solvent partly in the dissolution of crude sodium bifluoride at the aforementioned stage I and partly in the dissolution of aluminum hydroxide at the stage II. The foregoing procedure will enable cryolite to be produced in as high a yield as almost 98 percent, and acid requirements to be considerably reduced because the acid is only required in making up for handling loss of the circulating acid solvent.

In this circulating system, the use of hydrofluoric acid as a solvent for aluminum hydroxide has to be avoided, because the hydrofluoric acid is harmful on the dissolution of crude sodium bifluoride at the stage I as described before.

However, small amounts of hydrofluoric acid may be sometimes added to the circulating acid solution to regulate the content ratio of F/Na in the solution. Since $NaHF_2$ is a double salt of NaF and HF, the sodium bifluoride actualy used as an industrial raw material sometimes contains slightly less moles of HF than NaF owing to the including impurities such as NaCl, $Na_2SO_4$ etc. and the evaporating loss of HF. In such case, the ratio of F/Na in the circulating mineral acid will progressively become lower than the theoretical mole ratio of F/Na=2 in the pure cryolite. To prevent this abnormality, care should be taken additionally to supply small amounts of hydrofluoride acid to the circulating mineral acid so as to maintain this ratio in the acid solution at 2.0 to 2.2.

If the concentration of sodium bifluoride remained in the filtrate, which is separated from the produced cryolite precipitate, it is not sufficient to the dissoluion of aluminum hydroxide, it may be properly supplemented by adding a part of mineral acid solution of crude sodium bifluoride from which the impurities have been removed as described before.

The amount of circulating mineral acid solution, namely, the filtrate obtained after removal of the cryolite precipitate is to be almost equal to a sum of the quantities of mineral acid solutions used in dissolving crude sodium bifluoride and dissolving aluminum hydroxide. In other words, the aforesaid filtrate is diluted only to an extent equivalent to the amount of water produced by the reaction of the Formula 2. Therefore, separate portions of the filtrate may be circulated back to the step of dissolving crude sodium bifluoride and aluminum hydroxide respectively, directly or with additional supply of small amounts of mineral acid without any other concentrating process. In short, the mineral acids can be circulated only as a medium, so that it is not substantially subject to consumption excepting handling loss.

The whole circulating process of the present invention will be summarised by reference to the chart shown in the appended drawing. Crude sodium bifluoride 1 is dissolved at the dissolving step 11 in part of the filtrate as an acid solvent 7 obtained by separating the precipitate of cryolite at a filtering step 32. The impurities 4 precipitated from the solution 2 are removed at the filtering step 12. Main parts of the filtrate 3 after said removal are transferred to the reacting step 31, and the remaining minor portions flow to the dissolving step 21 to dissolve aluminum hydroxide. The Bayer process aluminum hydroxide 5 is subjected to the dissolving step 21 with the remainder of the aforementioned filtrate as an acid solvent 7. The resulting solution 6 is conducted to the reacting step 31, where both acid solutions 3 and 6 are mixed, and cryolite crystallises out promptly according to the reaction between $NaHF_2$ and $Al(OH)_3$. The precipitate is filtered out of the mother liquor at the filtering step 32, end the filtrate 7 is circulated back as an acid solvent as described above. The filtered cake 8 is subjected to washing 33 and drying 34 to produce high purity cryolite 9.

The process of the present invention will be more fully understood with reference to the following specific examples. All percentages are by weight.

EXAMPLE 1

Crude sodium bifluoride used as a raw material consisted of 92.32% $NaHF_2$, 5.10% $Na_2SiF_6$, 0.56% $CaF_2$, 1.09% $Na_2SO_4$, 0.11% NaCl and 0.82% $H_2O$. There were dissolved 5.5 kg. of the raw material at normal temperature in 38 kg. of sulfuric acid at 20% concentration. The impurities then precipitated were filtered out, and there was obtained a substantially pure acid solution of sodium bifluoride. The Si content of the solution was analysed to be 0.05% as $SiO_2$ on the basis of $NaHF_2$ contained in the solution.

On the other hand, 1.5 kg. of the Bayer process aluminum hydroxide of almost 100% purity were introduced into a mixture of 10 kg. of 20% sulfuric acid and 6.0 kg. of the aforesaid acid solution of sodium bifluoride, and completely dissolved therein with stirring for one hour at a temperature of 85° C.

The remainder of the above-mentioned acid solution of sodium bifluoride from which 6.0 kg. had been deducted for the dissolution of aluminum hydroxide was mixed with the acid solution of aluminum hydroxide. Reaction was carried out with stirring for 20 minutes at normal temperature, and the resulting precipitate of cryolite was filtered out, water-washed and dried at 100° C., and there were obtained 4.0 kg. of cryolite. This cryolite was composed of 32.8% Na, 12.8% Al, 54.3% F, 0.03% $SiO_2$ and 0.001% $Fe_2O_3$. The ignition loss of the product after heating at 500° C. and 800° C. for one hour was 0.4% and 0.87% respectively.

After the filtration, there was obtained 50 kg. of filtrate which contained 18.6% of sulfuric acid and 3.0% of sodium bifluoride. The yield of cryolite based on the crude sodium bifluoride was 70%.

EXAMPLE 2

There were dissolved 3.9 kg. of the same kind of crude sodium bifluoride as in Example 1 at normal temperature in 40 kg. of the filtrate taken out of the 50 kg. thereof obtained in the final stage of Example 1, and the resulting precipitate of impurities were filtered out. The Si content of the solution was 0.04% as $SiO_2$ on the basis of $NaHF_2$ contained therein.

On the other hand, the remaining 10 kg. of the aforesaid 50 kg. of filtrate and 4.5 kg. of the above-mentioned acid solution of crude sodium bifluoride were mixed together, and then 1.5 kg. of the Bayer process aluminum hydroxide were added to the mixture to dissolve with stirring for one hour at 75° C.

Reaction was carried out in the same manner as in Example 1, and there were obtained 4.0 kg. of cryolite having substantially the same quality as the product of Example 1. The filtrate after removal of cryolite precipitate contained 18.1% of $H_2SO_4$ and 3.1% of $NaHF_2$, and was circulated back for re-use as the medium. The yield of cryolite based on the crude sodium bifluoride was 98%.

EXAMPLE 3

There were dissolved 2.3 kg. of the same kind of crude sodium bifluoride as in Example 1 at normal temperature in 12 kg. of hydrochloric acid at 15% concentration. The impurities then precipitated were filtered out, and there was obtained a substantially pure acid solution of sodium bifluoride. The Si content of the solution was 0.03% as $SiO_2$ on the basis of the $NaHF_2$ contained therein.

On the other hand, 0.9 kg. of the Bayer process aluminum hydroxide were introduced into a mixture of 7 kg. of hydrochloric acid at 15% concentration, and 1.0 kg. of the afore-mentioned acid solution of sodium bifluoride, and completely dissolved with stirring for one hour at 70° C.

The remainder of the afore-mentioned acid solution of sodium bifluoride from which 10 kg. had been deducted was mixed with the above-mentioned acid solution of aluminum hydroxide to react with each other in the same manner as in Example 1. There were obtained 2.05 kg. of cryolite having the same quality as that of Example 1. There were separated 17.5 kg. of filtrate containing 15% of HCl and 1.3% of $NaHF_2$. The yield of cryolite based on the crude sodium bifluoride was 85.7%.

The final filtrate could be re-used by circulation as in Example II with a result of increased yield to 98%.

EXAMPLE 4

There were dissolved 4.5 kg. of the same kind of crude sodium bifluoride as in Example 1 at normal temperature in a mixed acid of 15 kg. of 20% sulfuric acid and 15 kg. of 10% hydrochloric acid. The resulting precipitate of impurities was filtered out, and there was obtained a substantially pure acid solution of sodium bifluoride. The Si content of the solution was 0.04% as $SiO_2$ on the basis of $NaHF_2$ contained therein.

On the other hand, 1.8 kg. of the Bayer process aluminum hydroxide were introduced into an admixture of 20 kg. of the same mixed acid as those intitially used and 3 kg. of the above-mentioned acid solution of sodium bifluoride, and completely dissolved in the same manner as in Example 1.

Reaction was carried out under the same conditions as in Example 1, and there were obtained 3.7 kg. of cryolite having substantially the same quality as that of Example 1. The yield of cryolite was 79%, and this could be increased to 98% when the final filtrate was recycled as in Example 1.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method of preparing artificial cryolite which comprises:
    (a) dissolving crude sodium bifluoride in a mineral acid solvent selected from the group consisting of hydrochloric acid, sulfuric acid, nitric acid and mixtures thereof and separating undissolved impurities from the resulting solution;
    (b) dissolving aluminum hydroxide of gibbsite type and consisting of coarse crystals in a mineral acid solvent of the aforesaid group to which has been added an amount of resulting solution obtained from said step (a) to provide a concentration of sodium bifluoride in the solution of from 2 to 9 percent by weight;

(c) mixing resulting solution from step (a) with the solution from step (b) in the ratio of about 3 moles of sodium bifluoride to 1 mole of aluminum hydroxide to form and precipitate cryolite; and (d) separating the precipitated cryolite from the mother liquor to be washed and dried.

2. The method as defined in claim 1 wherein the sodium bifluoride by weight in step (c) is 1 to 9 percent in excess over the stoichiometric ratio of 3 moles of sodium bifluoride to 1 mole of aluminum hydroxide.

3. The method as defined in claim 1 wherein the mother liquor separated in step (d) is recycled to steps (a) and (b) as the solvent.

4. The method as defined in claim 1 wherein said mineral acid solvent is hydrochloric acid which is used at a concentration from 5 to 20 percent by weight.

5. The method as defined in claim 1 wherein said mineral acid solvent is sulfuric acid which is used at a concentration from 15 to 25 percent by weight.

6. The method as defined in claim 1 wherein said mineral acid solvent is nitric acid which is used at a concentration from 10 to 20 percent by weight.

7. The method as defined in claim 1 wherein small amounts of hydrofluoric acid are added to said mineral acid solvent in step (b) so that the mole ratio of F/Na in the solvent is from 2 to 2.2.

8. The method as defined in claim 1 wherein the amount of mineral acid solvent used in step (a) is from 1 to 2 times the amount required to form a saturated solution of sodium bifluoride.

9. A method of preparing artificial cryolite which comprises:

(a) adding crude sodium bifluoride to a mineral acid solvent selected from the group consisting of hydrochloric acid, sulfuric acid, nitric acid and mixtures thereof in an amount between 1 and 2 times by weight the amount required to form a saturated solution of said sodium bifluoride in said mineral acid solvent, (b) separating undissolved material from the solution resulting from step (a), (c) dissolving aluminum hydroxide of gibbsite type and consisting of coarse crystals in a mineral acid solvent of the aforesaid group to which has been added an amount of the solution resulting from step (b) to provide a concentration of sodium bifluoride in the resulting solution of between about 2 to 9% by weight, (d) mixing solution resulting from step (b) with solution resulting from step (c) in quantities to give a ratio of about 3 moles of sodium bifluoride to 1 mole of aluminum hydroxide to form and precipitate cryolite, (e) separating precipitated cryolite from mother liquor resulting from step (d), and (f) recycling mother liquor from step (e) in the process as at least part of said mineral acid solvent.

References Cited

UNITED STATES PATENTS

| 382,505 | 5/1888 | Bayer | 23—143 |
|---|---|---|---|
| 515,895 | 3/1894 | Bayer | 23—143 |
| 2,522,605 | 9/1950 | Cundiff | 23—143 |
| 2,557,891 | 6/1951 | Porter | 23—143 |
| 2,559,653 | 7/1951 | Mooney | 23—143 |
| 2,657,978 | 11/1953 | Johnson | 23—143 |

FOREIGN PATENTS

| 425,908 | 3/1935 | Great Britain. |
|---|---|---|
| 486,380 | 6/1938 | Great Britain. |

OTHER REFERENCES

AEC-tr-3927 (Part I)—"The Chemistry of Fluorine and Its Inorganic Compounds" by I. G. Ryss, Moscow 1956, pp. 117–121.

EDWARD STERN, Primary Examiner

U.S. Cl. X.R.

23—153